No. 870,704. PATENTED NOV. 12, 1907.
J. H. WESTON.
CHAIN.
APPLICATION FILED MAR. 28, 1907.
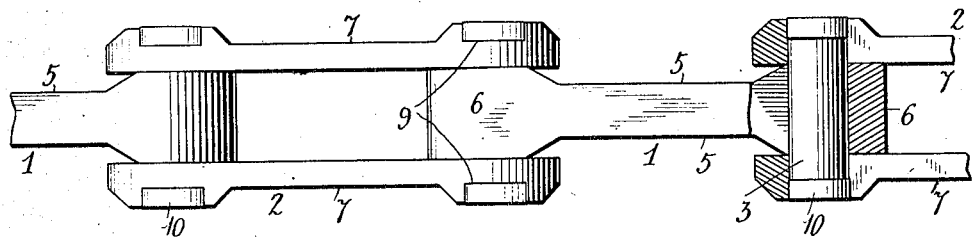
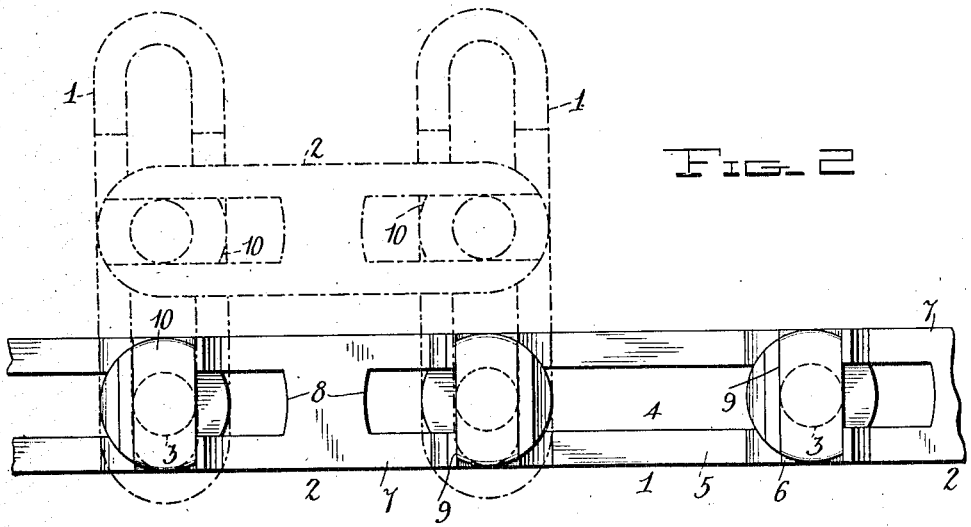
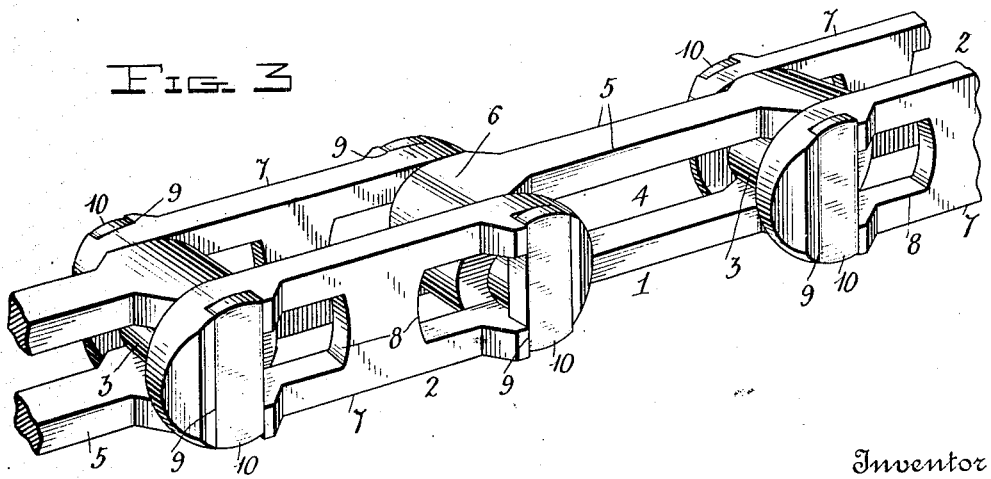
Witnesses
Inventor
James Henry Weston
by
Attorneys

UNITED STATES PATENT OFFICE.

JAMES H. WESTON, OF TAMAQUA, PENNSYLVANIA, ASSIGNOR OF ONE-THIRD TO JOHN F. WAGNER AND ONE-THIRD TO GEORGE A. WILFORD, OF TAMAQUA, PENNSYLVANIA.

CHAIN.

No. 870,704.     Specification of Letters Patent.     Patented Nov. 12, 1907.

Application filed March 28, 1907. Serial No. 365,010.

*To all whom it may concern:*

Be it known that I, JAMES H. WESTON, a citizen of the United States, residing at Tamaqua, in the county of Schuylkill and State of Pennsylvania, have invented certain new and useful Improvements in Chains; and I do declare the following to be a full, clear, and exact description of the invention, such as will enable others skilled in the art to which it appertains to make and use the same.

This invention is an improved chain having detachable links to enable it to be readily lengthened or shortened at will, and adapted for use as a sprocket chain and for other purposes, and it consists in the construction, combination and arrangement of devices hereinafter described and claimed.

In the accompanying drawings,—Figure 1 is partly a top plan view and partly a sectional view of a portion of a chain constructed in accordance with my invention; Fig. 2 is an elevation of the same, showing the links in extended, alining position in full lines and some of them in position to admit of their being disassembled in dotted lines; and Fig. 3 is a perspective view of the same.

My improved chain comprises links 1, links 2 and locking pins 3, which connect the said links together. Each link 1 is provided with a longitudinal slot 4, which extends nearly from end to end thereof and is recessed on opposite sides at points between its ends, as at 5, so that the intermediate portions of the link are narrowed and the end portions thereof are broadened, as at 6. The links 2 are disposed alternately with reference to the links 1, and each of the said links 2 comprise a pair of laterally-movable, separable members 7. Each of the said members 7 is provided near its ends with longitudinal slots 8 and is provided on its outer side, near its ends, with transverse recesses 9, which communicate with the said slots and are disposed at the outer ends thereof. The pins 3 connect the links 1 and 2 together, extend through the slots of the said links and are provided at their ends with heads 10, which are flatened on opposite sides. The length of said pins is such that when the links are extended, so that the separated side members of the link 2 bear against opposite sides of the broadened ends of the links 1, the heads of the said pins bear in the recesses 9 and extend transversely across the members of the link 2. It will be observed that the slots 4 in the links 1 enable the links of the chain, when the chain is slack, to be moved endwise with reference to one another.

To detach a link at any portion of the chain, two of the links 1 must be turned at right angles to said link 2, and moved longitudinally to bring their narrowed portions between the members of said link 2 and thus allow the said members to be moved toward each other a sufficient distance to enable the heads of the lock pins to clear the recesses 9 and allow said lock pins to be turned to cause their heads to lie parallel with the slots in said members and permit said members to be removed.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention, as defined by the appended claims.

Having thus described my invention, what I claim as new, and desire to secure by Letters-Patent, is,—

1. In a chain, the combination of a link having a slot extending nearly from end to end thereof and having a narrowed portion at a point intermediate its ends, a link comprising a pair of laterally-movable, separable members on opposite sides of the first-mentioned link, said members having slots and further provided on their outer sides with recesses communicating with said slots and disposed at an angle with reference thereto, and a pivoting lock element in the slots of said links connecting said links together and having heads for engagement with the recesses of the members of the separable member link, the length of said lock element between the heads thereof being substantially equal to the combined width of the broadened end of the first-mentioned link and the members of the separable-member link, for the purpose set forth.

2. In a chain, the combination of a link having a slot extending nearly from end to end thereof and having a narrowed portion at a point intermediate its ends, a link comprising a pair of laterally-movable, separable members on opposite sides of the first-mentioned link, said members having slots and further provided on their outer sides with transverse recesses coincident with and at an angle to the said slots, and pivoting lock elements in the slots of said links connecting said links together and having heads flattened on opposite sides for engagement with the recesses of the members of the separable-member link, the length of the said lock members between the heads thereof corresponding substantially with the combined thickness of the members of the separable member link and thickened end of the first-mentioned link.

In testimony whereof I have hereunto set my hand in presence of two subscribing witnesses.

JAMES H. WESTON.

Witnesses:
CHARLES M. MITCHELL,
JOHN H. MUCKLOW.